United States Patent
Devaraj et al.

(10) Patent No.: US 12,153,497 B2
(45) Date of Patent: Nov. 26, 2024

(54) BACKING-UP APPLICATION DATA FROM CLOUD-NATIVE APPLICATIONS

(71) Applicant: Kasten, Inc., Columbus, OH (US)

(72) Inventors: Pavan Navarathna Devaraj, San Jose, CA (US); Vaibhav Kamra, Sunnyvale, CA (US); Julio Lopez, Mountain View, CA (US); Thomas Manville, Mountain View, CA (US); Niraj Tolia, Los Altos, CA (US)

(73) Assignee: Kasten, Inc., Columbus, OH (US)

( * ) Notice: Subject to any disclaimer, the term of this patent is extended or adjusted under 35 U.S.C. 154(b) by 0 days.

(21) Appl. No.: 17/200,278

(22) Filed: Mar. 12, 2021

(65) Prior Publication Data

US 2022/0291998 A1    Sep. 15, 2022

(51) Int. Cl.
*G06F 16/00* (2019.01)
*G06F 11/14* (2006.01)
*G06F 16/215* (2019.01)
*G06F 16/245* (2019.01)
*G06F 21/60* (2013.01)

(52) U.S. Cl.
CPC ...... *G06F 11/1464* (2013.01); *G06F 11/1453* (2013.01); *G06F 16/215* (2019.01); *G06F 16/245* (2019.01); *G06F 21/602* (2013.01); *G06F 2201/84* (2013.01)

(58) Field of Classification Search
CPC ............. G06F 11/1464; G06F 11/1453; G06F 16/215; G06F 16/245; G06F 21/602; G06F 2201/84
See application file for complete search history.

(56) References Cited

U.S. PATENT DOCUMENTS

| 10,698,925 | B1 * | 6/2020 | Zhao ..................... G06F 9/455 |
| 2017/0046146 | A1 * | 2/2017 | Jamjoom ................. G06F 8/62 |
| 2020/0012569 | A1 * | 1/2020 | Natanzon ............ G06F 16/1752 |
| 2020/0133795 | A1 * | 4/2020 | Rhodes ............... G06F 11/1469 |

OTHER PUBLICATIONS

Arundel et al., "Cloud Native DevOps with Kubernetes: Building, Deploying, and Scaling Modern Applications in the Cloud," Jan. 24, 2019, retrieved via IDS of Jan. 12, 2022 (Year: 2019).*

(Continued)

*Primary Examiner* — Tyler J Torgrimson
(74) *Attorney, Agent, or Firm* — Sterne, Kessler, Goldstein & Fox P.L.L.C.

(57) ABSTRACT

Embodiments described herein are directed to backing up and recovering cloud-native applications. In some embodiments, the data engine maps a first set of data volumes to a data repository dedicated to store a backup of the data associated with the application. Furthermore, the data engine transmits, using a dynamically generated process, the data stored in the identified first set of data volumes to the data repository for backup based on the mapping. The data engine may also initiate a recovery of the application. The data engine may use a new dynamically generated process to identify and transmit a respective data set to a corresponding data volume for storage. Moreover, the data engine may use the new process to restore the components of the application using each respective identified data set.

18 Claims, 7 Drawing Sheets

(56) References Cited

OTHER PUBLICATIONS

International Search Report and Written Opinion for International Application No. PCT/IB2021/052334, European Patent Office, Netherlands, mailed on Jun. 12, 2021, 10 pages.
Arundel, John et al., "Cloud Native DevOps with Kubernetes: Building, Deploying, and Scaling Modern Applications in the Cloud," Jan. 24, 2019, pp. 1-344, retrieved from: https://github.com/ffisk/books/blob/master/Cloud-Native-Devops-with-Kubernetes-full-book.pdf [retrieved on Jun. 15, 2020].

* cited by examiner

BACKING-UP APPLICATION DATA FROM CLOUD-NATIVE APPLICATIONS

BACKGROUND

Entities have increasingly started adopting cloud-native architectures and platforms to support their business-critical applications. Portions of these applications may be executed across multiple nodes (e.g., virtual machines) in a computing cluster. Each portion of the application is associated with large amounts of application data. Loss of any amount of the application data may cause a given application to become inoperable. As a result, it may be necessary to back up the application data so it can be recovered in such situations. However, conventional backup and recovery systems are not well-suited to backing up and recovering application data for cloud-native applications.

Conventional backup and recovery systems lack visibility and do not account for cloud-native applications' scale. For example, conventional backup and recovery systems back up the application data on a per-node basis. However, as multiple nodes may execute one application, this leaves application data of a single application distributed across multiple data storage devices. Additionally, this may result in the application data for a single application spread across multiple security domains and multiple deduplication domains. This may pose challenges when attempting to locate the application data during a recovery process.

Moreover, conventional backup and recovery systems do not account for the fact that the set of applications executing on the computing cluster, and the composition of each respective application, may be constantly changing. For example, developers may add, remove, and modify applications executing on the computing cluster. As a result, additional applications, micro-services, and data volumes may be added to the computing cluster. However, conventional backup and recovery systems use static mapping of the data volumes of the application data. Therefore, these conventional backup and recovery systems may fail to capture all of the application data by not accounting for the newly added additional applications, micro-services, and data volumes.

In light of the above, conventional backup and recovery systems provide inefficient and ineffective solutions for backing up application data from cloud-native applications. If the conventional backup and recovery systems are unable to back up the application data effectively, the conventional backup and recovery systems may fail to quickly and easily restore the application data in case of failure or a disaster. This can leave the underlying application inoperable.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
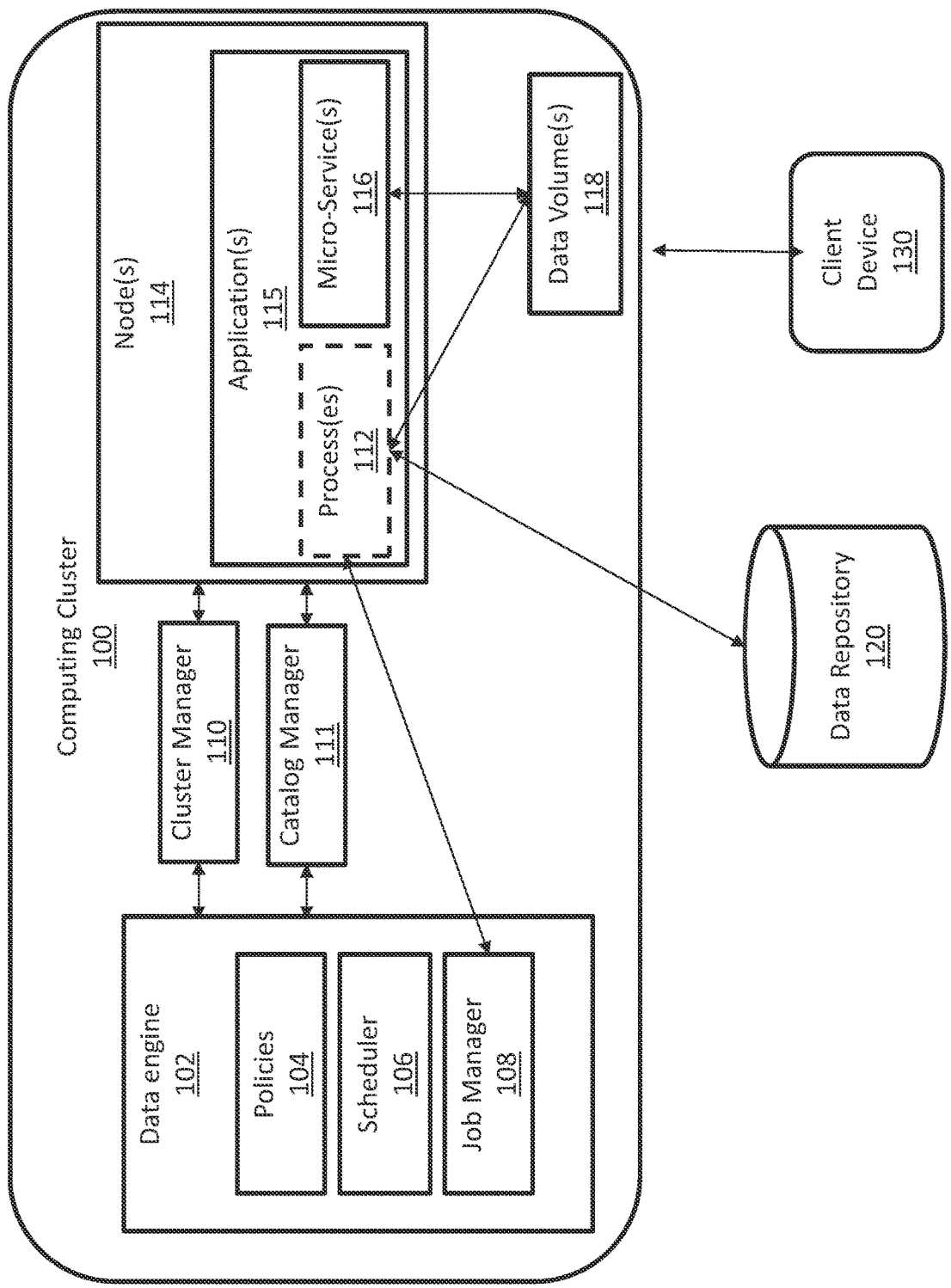
FIG. 1 is a block diagram of an architecture for backing up application data of cloud-native applications, according to some embodiments.

Provided herein are system, apparatus, device, method and/or computer program product embodiments, and/or combinations and sub-combinations thereof, for backing up application data of cloud-native applications.

As described above, conventional backup and recovery systems are inefficient and ineffective in backing up application data for cloud-native applications. In particular, conventional backup and recovery systems lack visibility and do not account for cloud-native applications' dynamic nature.

For example, entities (e.g., businesses, organizations, and government agencies) often use cloud orchestration systems (e.g., Kubernetes developed by Google, Inc.) to deploy, scale, and manage cloud-native applications executing in a cloud-native architecture and platform. The cloud orchestration systems allow developers to scale portions of a single application to be executed on multiple nodes on a computing cluster based on a particular node's workload. Furthermore, the cloud orchestration systems allow developers to change the makeup of the application dynamically.

However, these conventional backup and recovery systems have little to no visibility to the composition of an application executing in a computing cluster. As a result, these conventional backup and recovery systems may be unaware of all of the micro-services and data volumes of a given application executing on the computing cluster. Furthermore, as indicated above, these conventional backup and recovery systems attempt to back up cloud-native applications on a per-node basis. However, since portions of a single application may be distributed across multiple nodes, it may be inefficient to back up the application based on a node. Additionally, these conventional backup and recovery systems do not account for the cloud orchestration systems' dynamic capabilities when executing cloud-native applications. Lastly, these conventional backup and recovery systems do not scale to cloud-native applications executing on cloud-native architectures and platforms.

Embodiments herein solve the technological issues and challenges posed by conventional backup and recovery systems by using a dedicated data repository to back up a single application's application data. Moreover, embodiments herein provide an agentless, server-less architecture with a per-application backup repository and deduplication domain. In particular, embodiments herein provide for backing up all of the data of an application without a dedicated server or agent, and store all of the data in a dedicated data repository. The dedicated data repository allows for all of the application to be stored in a single deduplication and security domain.

In some embodiments, a data engine initiates a backup of data associated with an application. The application comprises a first set of micro-services executing across one or more nodes of a computing cluster. The data engine queries a cluster manager of the computing cluster to identify a first set of data volumes corresponding to the first set of micro-services. The first set of data volumes store the data associated with the application. The data engine maps the identified first set of data volumes to a data repository dedicated to store a backup of the data associated with the application. Additionally, the data engine generates a process to back up the data stored in the identified first set of data volumes to the data repository based on the mapping. In some embodiments, the data engine may generate a set of processes. Furthermore, the data engine transmits, using the process (or set of processes), the data stored in the identified first set of data volumes to the data repository for backup.

The above-described embodiments solve the technological problems presented by conventional backup and recovery systems in at least four ways.

First, embodiments herein ensure that all of the data of a single application is backed up on a dedicated data repository. This allows for efficient access to the application's data in the event it is to be retrieved from the dedicated data repository during a recovery process. Furthermore, during a recovery process, the embodiments herein do not block or disrupt other applications' operations. This results in improved backup efficiency and reliability.

Second, embodiments herein also allow the application's data to be stored in a single deduplication domain and security domain. The deduplication procedures for the data of the application stored across data volumes may be performed in the dedicated data repository. In this regard, this configuration provides for identifying and deduplicating the similarities in all of the data of the application. Additionally, because the application's data is stored in the dedicated data repository, the data of the application is encrypted and decrypted using a single encryption methodology.

Third, embodiments herein account for the cloud-native applications' dynamic nature. By querying a cluster manager to identify the micro-services of an application and dynamically generating processes to back up the data associated with the identified micro-services, the embodiments herein ensure that the data associated with micro-services that are newly added to an application is backed up. As a result, all of the data associated with the application is accounted for and backed up. This allows for dynamic scaling that matches the applications and computing cluster's scale. Moreover, as the processes are terminated after a backup or recovery process, there is no idle footprint. Additionally, each application in the computing cluster may instantiate its own data engine such that the backup and recovery processes can be parallelized across applications, data volumes, and internal data transfers.

Finally, embodiments herein do not require users to alter the applications executing in the computing cluster. Furthermore, embodiments herein also do not require layered storage. As a result, embodiments herein prevent performance loss and reduce the risk of any operational errors or system failures.

FIG. 1 is a block diagram of an architecture for backing up application data of cloud-native applications, according to some embodiments. In some embodiments, the architecture may include a computing cluster 100, data repository(ies) 120, and client device 130. Computing cluster 100, data repositories 120, and client device 130 can be connected through wired connections, wireless connections, or a combination of wired and wireless connections.

As an example, computing cluster 100, data repositories 120, and client device 130 can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Computing cluster 100 may reside in a cloud computing environment and can be managed by a cloud orchestration system. Computing cluster 100 may include a data engine 102, cluster manager 110, catalog manager 111, node(s) 114, and data volume(s) 118. Data engine 102 may include policies 104, scheduler 106, and job manager 108. Furthermore, data engine 102 may be in communication with cluster manager 110. Data engine 102 may use policies 104, scheduler 106, job manager 108, cluster manager 110, and processes 112 to back up data stored in the data volumes 118 in the data repositories 120. In some embodiments, data engine 102 may be implemented using the Kubernetes k10 data engine.

The data stored in each of the data volumes 118 may be associated with at least one micro-service 116 of at least one application 115. Each of the micro-services 116 may be associated with at least one application 115 and may be executed on at least one node 114. An application 115 may be a cloud-native application, and each node 114 may be a separate virtual machine or physical machine. A virtual machine may be a virtualized computing system. The computing system may be a collection of computing resources such as servers, routers, workstations, etc. In this regard, each node 114 may be configured to host and execute one or more micro-services 116 of various applications 115.

A micro-service 116 may be one or more containerized processes or tasks of an application made up of loosely coupled services. The one or more processes or tasks may be grouped in a single micro-service based on business logic or variable dependencies. In this regard, each of the micro-services 116 may correspond to an application 115. Each application 115 may include a plurality of micro-services 116 distributed across multiple nodes 114. Each of the micro-services 116 may be distributed across multiple nodes 114 based on the workload of the respective nodes 114. As such, each node 114 may not execute all of an application 115's micro-services. Moreover, each node 114 may execute one or more micro-services 116 of various applications 115.

As a non-limiting example, each of the micro-services 116 may be executed as a Kubernetes pod (of simply pod). A pod may be a group of one or more containers. The containers may share storage and network resources and a specification for how to run the containers. The processes or tasks of a micro-service 116 may reside in the one or more containers.

Each of the micro-services 116 may generate and use data stored in the data volumes 118. Each of the micro-services 116 may correspond to one or more of the data volumes 118. The data stored in each of the data volumes 118 may include, but is not limited to, file directory data, documents, image files, data files, databases, configuration files, etc. Each of the micro-services 116 may use the data stored in the data volumes 118 to perform the processes or tasks. Moreover, each of the micro-services 116 may store output data in the data volumes 118.

A data volume 118 may be one or more data storage devices configured to store different types of data. The one or more data storage devices may include data repositories or databases. The databases may be relational or non-relational databases.

A data repository 120 may be one or more data storage devices configured to store different data types. A data repository 120 may store a backup of data stored in data volumes 118. Each data repository 120 may be dedicated to storing data corresponding to a single application 115. As a result, each data repository 120 may receive and store data associated with the micro-services 116 of an application 115 executing across nodes 114. In some embodiments, data repositories 120 may reside within computing cluster 100. In some other embodiments, data repositories 120 may reside outside computing cluster 100. In some embodiments, data repositories 120 may implement blob storage. Data repositories 120 may include Amazon Web Services (AWS) S3, MinIO, Google GCS, Azure Blob, or other blob stores as would be appreciated by a person of ordinary skill in the art.

As indicated above, data engine 102 may use policies 104, scheduler 106, job manager 108, cluster manager 110, and processes 112 to back up data stored in data volumes 118 in data repositories 120. For example, policies 104 may be a module or data storage device configured to store circumstances and schedules for backing up the data associated with the one or more micro-services 116 of application 115. The circumstances may include events that may trigger a backup of data associated with application 115's one or more micro-services 116. For example, the events may include a request transmitted by client device 130, a change to the makeup of the application 115 (e.g., the addition or removal of micro-services), general maintenance being performed to one or more components of computing cluster 100, etc. Policies 104 may also include a time/date-based schedule for initiating backups of data associated with one or more micro-services 116 of the application 115.

Scheduler 106 may be an application that controls the schedule for backing up data stored in data volumes 118 in data repositories 120 based on policies 104. Job manager 108 may be responsible for generating jobs for backing up data stored in data volumes 118 in data repositories 120. For example, job manager 108 may generate one or more processes 112 for each data volume 118 to copy and transmit data stored in data volumes 118 into a data repository 120 in response to initiating a backup of the data associated with one or more micro-services of the given application. The processes 112 may be executed as a pod under the application namespace of a given application on each node 114 which executes one or more micro-services 116 for the given application 115. That is, the processes 112 may be included in one or more containers. The processes 112 may be dynamically created when backing up or restoring applications 115. This allows data engine 102 to backup data and restore applications 115 without backup servers, per-host server, or per-application agent. The processes 112 (and corresponding pods) may be terminated after the completion of the backup of the data stored in data volumes 118. In some embodiments, the processes 112 may be executed as sidecar containers. A sidecar container is a container that is executed in an existing pod.

Cluster manager 110 may be an agent configured to manage the micro-services 116 and data volumes 118 on computing cluster 100. Cluster manager 110 may keep track of micro-services 116, the corresponding applications 115, and the corresponding data volumes 118. Furthermore, cluster manager 110 may keep track of nodes 114 on which each of the micro-services 116 are being executed.

Catalog manager 111 may be a service configured to store the composition of applications 114 executing on computing cluster 100. Data engine 102 may query catalog manager 111 to identify the composition of a given application 114 during the restore process of the application 114. The composition of the given application 114 may include the one or more components of the given application (e.g., workloads, micro-services, data volumes, stateless sets, etc.).

Figure 2:
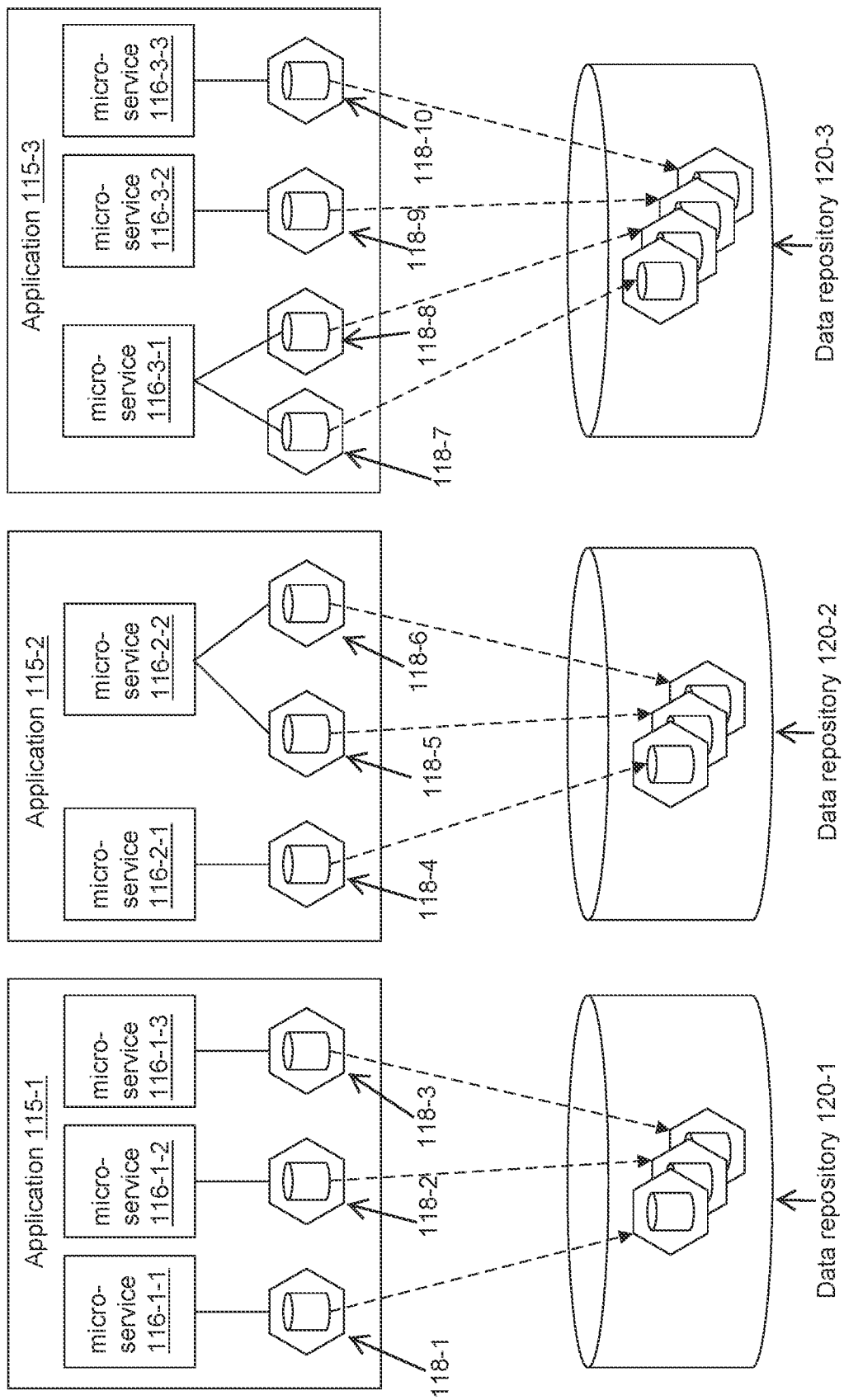
FIG. 2 is a block diagram illustrating cloud-native applications, micro-services corresponding to the different applications, and data repositories, according to some embodiments.

FIG. 2 is a block diagram illustrating the different applications, corresponding micro-services, and data repositories, according to some embodiments. FIG. 2 shall be described with reference to FIG. 1.

As indicated above, computing cluster 100 may include micro-services 116 of applications 115 executing on nodes 114. Micro-services 116 may correspond to different applications 115. As a non-limiting example, applications 115 may include application 115-1, application 115-2, and application 115-3. Applications 115-1, 115-2, and 115-3 may be made up of micro-services, workloads, persistent data volumes, and other configuration components. The workloads may include Kubernetes (k8s) deployment information, stateful sets, etc. Micro-services 116 may execute one or more tasks or processes for the corresponding application.

Continuing the above-limiting example, micro-services 116 may include micro-service 116-1-1, micro-service 116-1-2, and micro-service 116-1-3 corresponding to application 115-1. Micro-services 116 may also include micro-service 116-2-1 and micro-service 116-2-2 corresponding to application 115-2. Micro-services 116 may also include micro-service 116-3-1, micro-service 116-3-2, and micro-service 116-3-3 corresponding to application 115-3.

Each of micro-service 116-1-1, micro-service 116-1-2, and micro-service 116-1-3 may be micro-services 116 that are configured to execute one or more tasks for application 115-1. Micro-service 116-1-1, micro-service 116-1-2, and micro-service 116-1-3 may operate independently. Alternatively, micro-service 116-1-1, micro-service 116-1-2, and micro-service 116-1-3 may depend on outputs from one another. Similarly, micro-service 116-2-1 and micro-service 116-2-2 may be micro-services configured to execute one or more tasks for application 115-2. Micro-service 116-2-1 and micro-service 116-2-2 may operate independently of one another. Alternatively, micro-service 116-2-1 and micro-service 116-2-2 may depend on outputs from one another. Furthermore, micro-service 116-3-1, micro-service 116-3-2, and micro-service 116-3-3 may be micro-services configured to execute one or more tasks for application 115-3. Micro-service 116-3-1, micro-service 116-3-2, and micro-service 116-3-3 may operate independently. Alternatively, micro-service 116-3-1, micro-service 116-3-2, and micro-service 116-3-3 may depend on outputs from one another.

A user may add or remove micro-services 116 from the corresponding application 115. For example, a user may use client device 130 to interface with application 115-1, application 115-2, and application 115-3. The user may use client device 130 to change the makeup of applications 115-1-115-3. This may involve adding, removing, or modifying micro-services, workloads, stateful sets, data volumes, etc.

As indicated above, an application 115 can include data volumes 118. Each micro-service 116 of an application 115 may correspond with 0, 1, or more data volumes 118. That is, a given micro-service 116 of a given application 115 may use data stored in one or more data volumes and store output data in the one or more data volumes 118.

As a non-limiting example, data volumes 118 may include data volumes 118-1-118-10. Data volume 118-1 may store data associated with micro-service 116-1-1, data volume 118-2 may store data associated with micro-service 116-1-2, and data volume 118-3 may store data associated with micro-service 116-1-2. Data volume 118-4 may store data associated with micro-service 116-2-1, data volume 118-5 may store data associated with micro-service 116-2-2, and data volume 118-6 may also store data associated with micro-service 116-2-2. Data volume 118-7 and data volume 118-8 may store data associated with micro-service 116-3-1, data volume 118-9 may store data associated with micro-service 116-3-2, and data volume 118-10 may store data associated with micro-service 116-3-2.

All of the data associated with a given application 115 may be backed up in a single data repository 120. As a non-limiting example, data repositories 120 may include data repository 120-1, data repository 120-2, and data repository 120-3. Data repository 120-1, 120-2, and 120-3 may be dedicated to storing data associated with application 115-1, 115-2, and 115-3, respectively. As a result, data repository 120-1 may be dedicated to storing data associated with micro-service 116-1-1, micro-service 116-1-2, and micro-service 116-1-3 corresponding to application 115-1. Similarly, data repository 120-2 may be dedicated to storing data associated with micro-service 116-2-1 and micro-service 116-2-2 corresponding to application 115-2. Furthermore, data repository 120-3 may be dedicated to storing data associated with micro-service 116-3-1, micro-service 116-3-2, and micro-service 116-3-3 corresponding to application 115-3. Therefore, the data stored in data volumes 118-1-118-3 may be backed up in data repository 120-1, the data stored in data volumes 118-4-118-6 may be backed up in data repository 120-2, and the data stored in data volumes 118-7-118-10 may be backup up in data repository 120-3.

Figure 3:
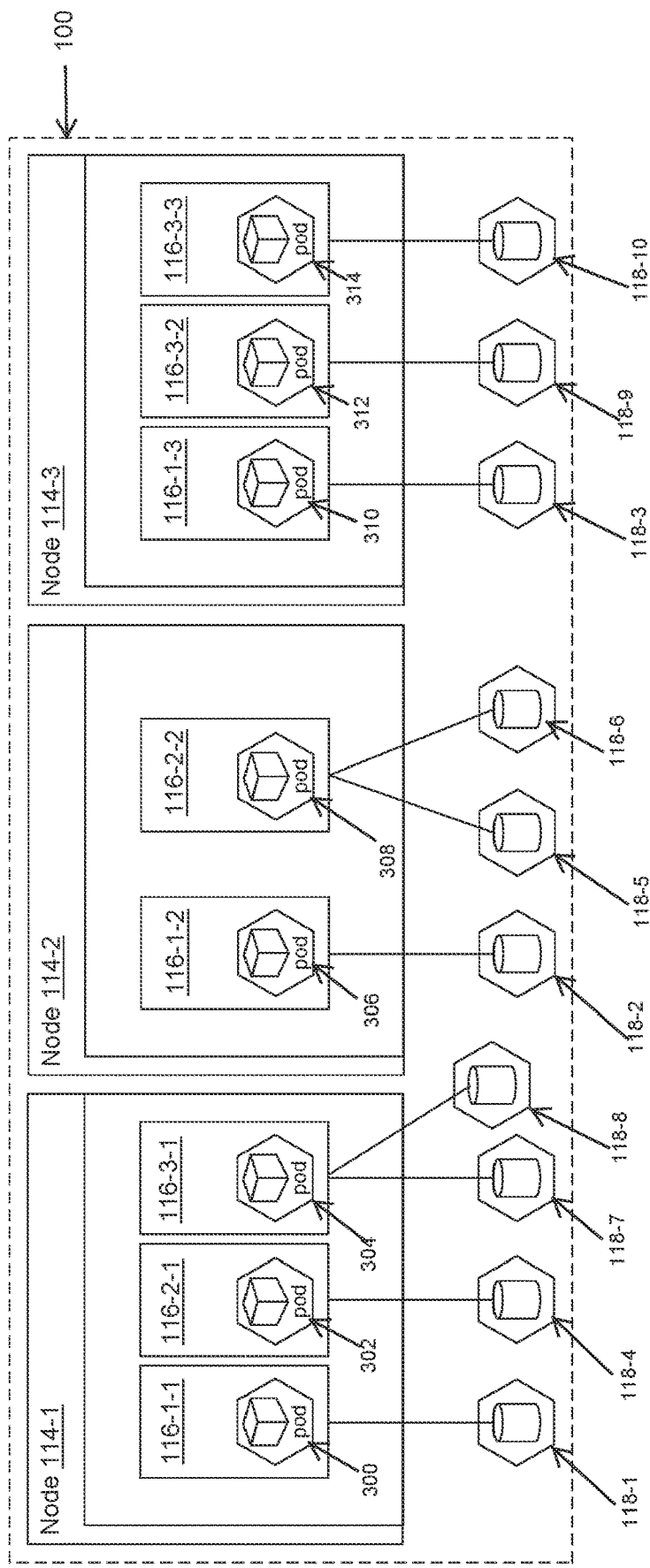
FIG. 3 is a block diagram illustrating the micro-services executing on various nodes, according to some embodiments.

FIG. 3 is a block diagram illustrating the micro-services executing on various nodes, according to some embodiments. FIG. 3 shall be described with reference to FIGS. 1-2.

As described above, micro-services 116 may execute on nodes 114 executing on computing cluster 100. As a non-limiting example, nodes 118 may include node 114-1, node 114-2, and node 114-3. Each of nodes 114-1-114-3 may be virtual machines configured to execute micro-services 116 corresponding to various applications 115.

Node 114-1 may execute micro-service 116-1-1 of application 115-1, micro-service 116-2-1 of application 115-2, and micro-service 116-3-1 of application 115-3. Node 114-2 may execute micro-service 116-1-2 of application 115-1 and micro-service 116-2-2 of application 115-2. Node 114-3 may execute micro-service 116-1-3 of application 115-1, micro-service 116-3-2, and micro-service 116-3-3 of application 115-3.

Nodes 114-1-114-3 may implement application namespaces. An application namespace may be an object that partitions or isolates an application's components from other components of other applications executing on the same node. As such, micro-service 116-1-1 may be executed on node 114-1 under the application namespace of application 115-1, micro-service 116-2-1 may be executed on node 114-1 under the application namespace of application 115-2, and micro-service 116-3-1 may be executed on node 114-1 under the application namespace of application 115-3. Similarly, micro-service 116-1-2 may be executed on node 114-2 under the application namespace of application 115-1, and micro-service 116-2-2 may be executed on node 114-2 under the application namespace of application 115-2. Furthermore, micro-service 116-1-3 may be executed on node 114-3 under the application namespace of application 115-1, micro-service 116-3-2 may be executed on node 114-3 under the application namespace of application 115-3, and micro-service 116-3-3 may be executed on node 114-3 under the application namespace of application 115-3.

The micro-services 116 executing on a node 114 may be assigned to the node 114 based on the node 114's workload. For example, node 114-1 and node 114-3 may execute three micro-services 116-1-1, 116-2-1, 116-3-1, 116-1-3, 116-3-2, and 116-3-3, and node 114-2 may execute two micro-services 116-1-2 and 116-2-2. This is because one or both of the micro-services 116-1-, and 116-2-2 executing on node 114-2 may require additional computational or operational resources compared to the other micro-services 116-1-1, 116-2-1, 116-3-1, 116-1-3, 116-3-2, and 116-3-3.

Computing cluster 100 may dynamically assign a micro-service 116 to a different node 114 based on the node 114's workload. For example, if micro-service 116-3-1 requires additional computing resources, data engine 102 may move micro-service 116-2-1 to either node 114-2 or node 114-3. Similarly, if a user adds micro-services 116 to a given application 115, data engine 102 may dynamically assign the added micro-services 116 to a given node 114.

Each of the micro-services 116 may be configured to execute one or more tasks. These tasks may be executed as pods. For example, the tasks of micro-service 116-1-1 may be containerized in pod 300, the tasks of micro-service 116-2-1 may be containerized in pod 302, the tasks of micro-service 116-3-1 may be containerized in pod 304, the tasks of micro-service 116-1-2 may be containerized in pod 306, the tasks of micro-service 116-2-2 may be containerized in pod 308, the tasks of micro-service 116-1-3 may be containerized in pod 310, the tasks of micro-service 116-3-2 may be containerized in pod 312, and the tasks of micro-service 116-3-3 may be containerized in pod 314. Additional pods may be added to each of the micro-services.

In some embodiments, data engine 102 may map applications 115 to specific data repositories 120. For example, data engine 102 may map application 115-1 to data repository 120-1, application 115-2 to data repository 120-2, and application 115-3 to data repository 120-3. These mappings may indicate that data repository 120-1 is dedicated to backing up data associated with application 115-1, data repository 120-2 is dedicated to backing up data associated with application 115-2, and data repository 120-3 is dedicated to backing up data associated with application 115-3. Data engine 102 may generate the mappings at the time of onboarding an application on computing cluster 100. The mappings may be stored in policies 104.

Policies 104 may store a schedule or circumstances when data associated with a given application is backed up in one of the data repositories 120. For example, a given circumstance or schedule defined in policies 104 may trigger the backup of data associated with application 115-2. Data engine 102 may receive a request to initiate a backup of the data associated with application 115-2. In response to receiving the request, data engine 102 may query cluster manager 110 to identify the data volumes configured to store data associated with the micro-services of application 115-2. The query may include an identifier of application 115-2.

Cluster manager 110 may use the identifier of application 115-2 to identify the micro-services of application 115-2 executing on node 114-1 and node 114-2 under the application namespace of application 115-2. Furthermore, cluster manager 110 may identify the one or more data volumes corresponding to the micro-services of application 115-2.

By having cluster manager 110 identify the micro-services 116 of a given application 115 when initiating the backup, data engine 102 may identify new micro-services 116 and data volumes 118 added to computing cluster 100 after the last backup of the data. This ensures all of the data for the given application 115 is backed up.

Continuing with the above example, data engine 102 may determine that data volumes 118-4, 118-5, and 118-6 store data associated with micro-service 116-2-1 and micro-service 116-2-2 of application 115-2 based on the query. Data engine 102 may also determine that micro-service 116-2-1 is executing on node 114-1 and micro-service 116-2-2 is executing on node 114-2 based on the query. Data engine 102 may determine that the data associated with application 115-2 is to be backed up in data repository 120-2 based on the mapping stored in policies 104. As such, data engine 102 may map data volumes 118-4, 118-5, and 118-6 to data repository 120-2 so that the data stored in data volumes 118-4, 118-5, and 118-6 is to be backed up in data repository 120-2.

Scheduler 106 may schedule the backup of the data associated with application 115-2 at a given date and time. Job manager 108 may generate one or more processes 112 for each of the data volumes 118-4, 118-5, and 118-6 to back up the data associated with application 115-2. For example, job manager 108 may generate at least three processes to back up the data associated with application 115-2. Each process of the three processes corresponds with data volume 118-4, 118-5, and 118-6.

The one or more processes 112 may be pods that are to be executed under the application namespace of application 115-2 in node 114-1 and node 114-2. The one or more processes 112 for each respective data volume (e.g., data volumes 118-4, 118-5, and 118-6) may include instructions for copying the data stored in data volumes 118-4, 118-5, and 118-6, respectively, and storing the copied data in data repository 120-2, based on the mapping. More specifically, the one or more processes 112 for data volume 118-4, to be executed under the application namespace of application 115-2 in node 114-1, may include instructions for backing up data in data volumes 118-4. Furthermore, the one or more processes 112 for data volume 118-5, to be executed under the application namespace of application 115-2 in node 114-1, may include instructions for backing up data in data volume 118-5. Similarly, the one or more processes 112 for data volume 118-6, to be executed under the application namespace of application 115-2 in node 114-2, may include instructions for backing up data in data volumes 118-6. The instructions for the one or more processes 112 may also indicate that data volumes 118-4, 118-5, and 118-6 are associated with micro-service 116-2-1 and micro-service 116-2-2 and that micro-service 116-2-1 is executing on node 114-1 and micro-service 116-2-2 is executing on node 114-2.

Job manager 108 creates the one or more processes 112 for each data volume of a given application based on cluster manager 110 identifying the given application's micro-services 116 and data volumes 118. This ensures that the one or more processes 112 are created for new data volumes 118 corresponding to new micro-services 116 that were created since the previous backup of the application's data.

Continuing with the above example, at the given date and time, the one or more processes 112 for data volumes 118-4, 118-5, and 118-6 may initiate a backup of the data stored in data volumes 118-4, 118-5, and 118-6, respectively. The one or more processes 112 for data volume 118-4, to be executed under the application namespace of application 115-2 in node 114-1, may copy the data stored in data volume 118-4, and transmit the copied data to data repository 120-2 for storage. Similarly, the one or more processes 112 for data volume 118-5, to be executed under the application namespace of application 115-2 in node 114-1, may copy the data stored in data volume 118-5, and transmit the copied data to data repository 120-2 for storage. Furthermore, the one or more processes 112 for data volume 118-6, to be executed under the application namespace of application 115-2 in node 114-2, may copy the data stored in data volume 118-6 and transmit the copied data to data repository 120-2 for storage. The one or more processes 112 for data volumes 118-4, 118-5, and 118-6 may implement different methodologies for backing up the data stored in data volumes 118-4, 118-5, and 118-6. For example, the one or more processes 112 for data volumes 118-4, 118-5, and 118-6 may implement a full backup, incremental backup differential backup, file backup, filegroup backup, a partial backup, copy-only backup, mirror backup, transaction log backup, etc. Once the backup is complete, the one or more processes 112 for data volumes 118-4, 118-5, and 118-6 may be terminated.

Data repositories 120-1-120-3 may store data as snapshots corresponding to the micro-service and corresponding node. For example, continuing from the above example, data repository 120-2 may correlate the backed up data from data volume 118-4 to data volume 118-4, micro-service 116-2-1, and node 114-1. Similarly, data repository 120-2 may correlate the backed-up data from data volumes 118-5 and 118-6 to data volumes 118-5 and 118-6, micro-service 116-2-2, and node 114-2. Furthermore, Data repositories 120-1-120-3 may correlate the backup data associated with applications 115-1-115-3, respectively, to the backup's date and time. In the event that data needs to be restored to the appropriate data volumes, such a configuration allows a given process to efficiently and quickly identify where to transmit the backed-up data. Furthermore, the data of a given application may be restored to a given date and time.

In some embodiments, the data stored in data repository 120-1 may be encrypted and decrypted using a single encryption/decryption methodology. For example, the data in data repository 120-1 may be encrypted using the same public key and decrypted using the same private key. Similarly, the data stored in data repository 120-2 may be encrypted and decrypted using a single encryption/decryption methodology. Furthermore, the data stored in data repository 120-3 may be encrypted and decrypted using a single encryption/decryption methodology. By doing so, all of the backed-up data of applications 115-1, 115-2, and 115-3 may be independent and separate security domains. This way, only one encryption/decryption methodology is necessary when attempting to access any of the data of a given application. This allows for efficient access of any data of a given application during a recovery process.

In some embodiments, deduplication processes may independently be performed on the data stored in data repository 120-1, data repository 120-2, and data repository 120-3. Deduplication processes involve eliminating duplicate copies of repeating or similar data. Having a data repository 120 dedicated to storing backed-up data of a single application 115 allows deduplicating the similarities from across data volumes 118 belonging to the same application 115. This is more efficient than deduplicating the similarities of a portion of the data associated with a given application 115 because certain similarities or redundancies that exist across all of the data of the given application 115 may not be identified. Additionally, this is also more efficient than deduplicating the similarities of the data associated with multiple applications 115 in terms of performance and the use of operational resources.

In some embodiments, data engine 102 may initiate a recovery of an application using the data stored in data repositories 120. A recovery of the application may involve restoring the application's components using data associated with the application backed up in a data repository of data repositories 120.

For example, data engine 102 may receive a request to restore application 115-2. Application 115-2 may encounter an operational error that may cause micro-service 116-2-1 or micro-service 116-2-2 to stop operating. The operational error may occur based on a disaster, corrupt data, system failure, outage, etc. As a result, components of application 115-2 may need to be recovered and restored to a previous operational state using the data stored backed up data stored in data repository 120-2. Components of application 115-2 may include workloads, stateful sets, deployment services, micro-service 116-2-1, micro-service 116-2-2, data volumes 118-4-118-6, etc. Data engine 102 may receive a request from client device 130 to restore application 115-2. Alternatively, data engine 102 may determine that svc application 115-2 is no longer operational and may automatically initiate the recovery/restoration process.

In response to receiving the request or initiating the recovery/restoration process, data engine 102 may query catalog manager 111 to identify the micro-services and the data volumes of application 115-2. The query may include an identifier of application 115-2. Catalog manager 111 may use the identifier to identify micro-service 116-3-2 and micro-service 116-3-3 and data volumes 118-4, 118-5, and 118-6 executing in the application namespace of application 115-2 in nodes 114-1 and 114-2.

Data engine 102 may determine that micro-service 116-2-1 corresponds to data volume 118-4 and micro-service 116-2-2 corresponds to data volumes 118-5 and 118-6 based on the query. Data engine 102 may also determine that micro-service 116-2-1 is executed on node 114-1 and micro-service 116-2-2 is executed on node 114-2 based on the query. Additionally, data engine 102 may determine that the data associated with application 115-2 is backed up in data repository 120-2. Data engine 102 may determine an order in which the components and data of application 115-2 are to be restored. For example, the data associated with application 115-2 may include dependencies, and as a result, certain data may need to be loaded into data volumes 118-1, 118-2, or 118-3 before other data. Moreover, data engine 102 may determine that certain components of application 115-2 need to be restored before the other components of application 115-2 to ensure the components of application 115-2 function properly. For example, application 115-2's data volumes may need to be restored before the application 115-2's workloads or deployment services so that the workloads and deployment services may access the data stored in the data volumes.

Scheduler 106 may schedule the recovery/restoration of micro-service 116-2-1 and 2-2. Job manager 108 may generate one or more processes 112 for each of data volumes 118-1, 118-2, and 118-3. The one or more processes 112 may be executed in node 114-1 and node 114-2 under the application namespace of application 115-2. Furthermore, the one or more processes 112 may include instructions to restore the data associated with application 115-2, backed up in data repository 120-2, to the corresponding to data volumes data volumes 118-1, 118-2, and 118-3. For example, the one or more processes 112 for data volume 118-4 may include instructions to copy data corresponding to data volume 118-4 from data repository 120-2 and transmit the copied data to data volume 118-4 for storage. Similarly, the one or more processes 112 for data volume 118-5 may include instructions to copy data corresponding to data volume 118-5 from data repository 120-2 and transmit the copied data to data volume 118-5 for storage. Furthermore, the one or more processes 112 for data volume 118-6 may include instructions to copy data corresponding to data volume 118-6 from data repository 120-2 and transmit the copied data to data volume 118-6 for storage. The one or more processes 112 for each of data volumes 118-1, 118-2, and 118-3 may also include the desired order in which the data and components of application 115-2 are to be restored.

The one or more processes 112 for each of data volumes 118-1, 118-2, and 118-3 may copy the data stored in data repository 120-2 corresponding to data volumes 118-1, 118-2, and 118-3 of micro-service 116-2-1 and micro-service 116-2-2 executing on nodes 114-1 and 114-2, and transmit the copied data into data volumes data volumes 118-1, 118-2, and 118-3 for storage in the desired order. Furthermore, the one or more processes 112 for each of data volumes data volumes 118-1, 118-2, and 118-3 may generate the components of application 115-2 in the desired order using the data corresponding to data volumes data volumes 118-1, 118-2, and 118-3.

In some embodiments, data repository 120-2 may store the composition of application 114-2. The composition may include data volumes 118-1, 118-2, and 118-3, and micro-service 116-2-1 and micro-service 116-2-2. The one or more processes 112 may identify the data corresponding to data volumes 118-1, 118-2, and 118-3 based on the composition of application 114-2 stored in data repository 120-2.

In some embodiments, the data engine 102 may also retrieve a private key for decrypting the data stored in data repository 120-2 from policies 104. The one or more processes 112 for each of data volumes data volumes 118-1, 118-2, and 118-3 may include instructions to decrypt the data stored in data repository 120-2 corresponding to data volumes data volumes 118-1, 118-2, and 118-3 before copying it into data volumes data volumes 118-1, 118-2, and 118-3.

In response to successfully recovering application 115-2, processes 112 may be terminated. Furthermore, data engine 102 may attempt to relaunch micro-service 116-2-1 and 2-2 with the restored data and components.

In some embodiments, the request to restore application 115-2 may include instructions to restore the data in data volumes data volumes 118-1, 118-2, and 118-3 to a particular date and time. As indicated above, data repositories 120-1-120-3 may store different versions of the data corresponding to various dates and times. As a result, the one or more processes 112 for each of data volumes data volumes 118-1, 118-2, and 118-3 may include instructions to restore data backed up in data repository 120-2 corresponding to the desired date and time, data volumes data volumes 118-1, 118-2, and 118-3, and in the desired order.

Data engine 102 may also restore one or more micro-services of a given application using the above-described process.

In some embodiments, application 115-2's composition may change from the last backup of the data associated with application 115-2 and the restoring application 115-2. For example, a user may add, modify, or remove components of application 115-2. As such, cluster manager 110 may identify different micro-services and data volumes for application 115 during the restoration process of application 115.

Figure 4:
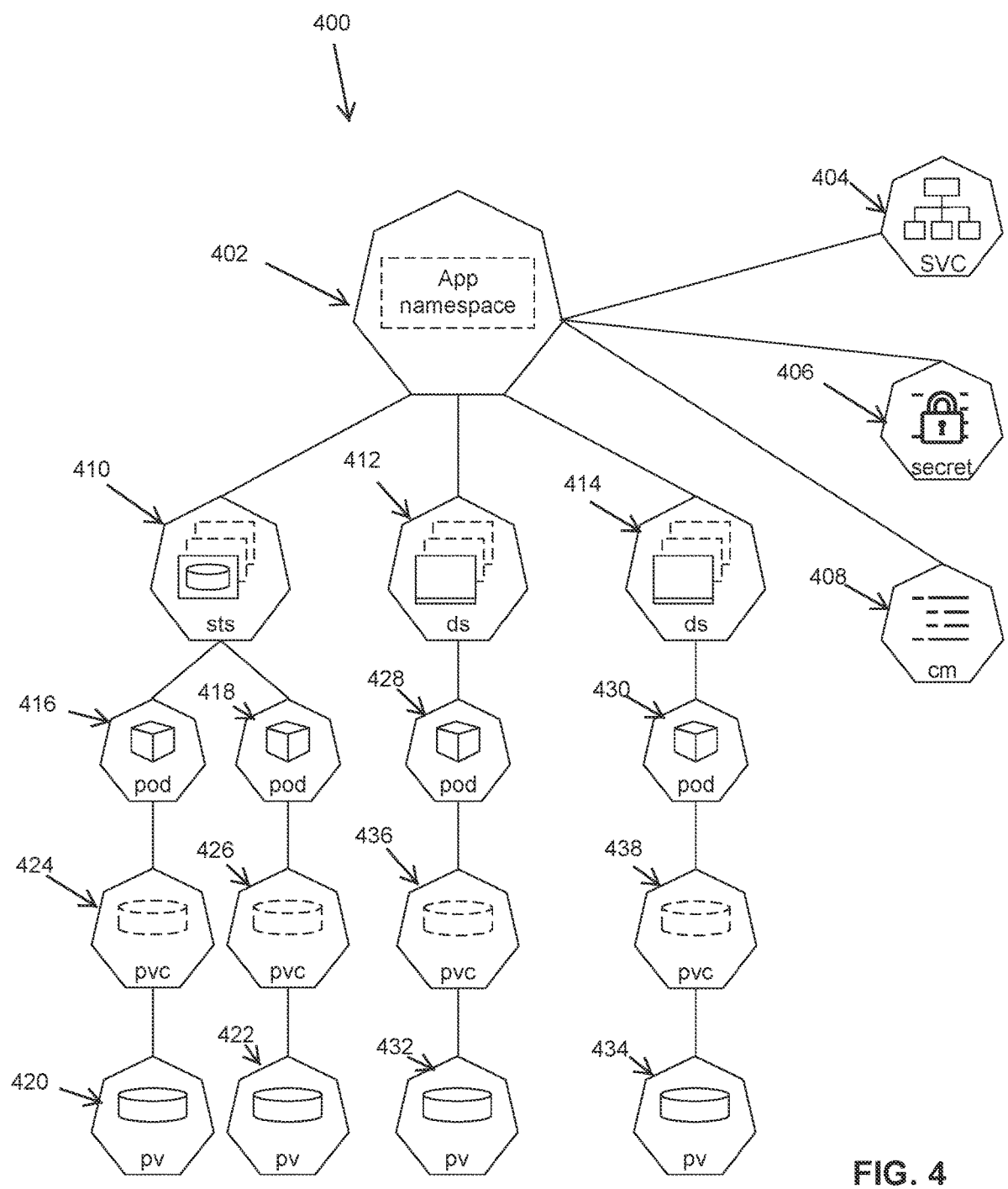
FIG. 4 is a block diagram that illustrates the components of an application, according to some embodiments.

FIG. 4 is a block diagram that illustrates the components of an application 400, according to some embodiments. Applications 115, as shown in FIG. 1, may include application 400. In a given embodiment, application 400 may include an application namespace 402, svc hierarchy 404, secret 406, configuration map 408, stateful set 410, and deployment services 412-414.

Application namespace 402 may be an object that can be used to partition or isolate application 400 for other applications executing on the same node. For example, the micro-services of application 400 may be executed under application namespace 402. Therefore, when queried, cluster manager 110 may identify micro-services belonging to a particular application based on the particular application's application namespace.

Svc hierarchy 404 may be a file that stores the hierarchy of micro-services of application 400. Secret 406 may be a file that stores sensitive information about application 400, such as passwords, encryption keys, or the like. Configuration map 408 may be a configuration file for application 400, which includes configuration information about application 400. Configuration map 408 may be an Application Program Interface (API) object used to store non-confidential information data in key-value pairs.

Stateful set 410 may be a workload API object that manages stateful applications. Stateful set 410 may correspond to pods 416 and 418. Stateful set 410 may manage deployment and scaling of pods 416 and 418.

Pods 416 and 418 may be part of the micro-services of application 400. Furthermore, pods 416 and 418 may correspond with persistent volumes 420 and 422, respectively. Persistent volumes 420 and 422 may store data associated with pods 416 and 418, respectively. Persistent volumes 420 and 422 may be data volumes (e.g., data volume(s) 118 as shown in FIG. 1) configured to store data necessary for pods 416 and 418 to perform their respective tasks and any data output by pods 416 and 418. Pods 416 and 418 may use Persistent volume claims 424 and 426 to access persistent volumes 420 and 422, respectively. Persistent volume claims 424 and 426 may be objects that may reside on the node with pods 416 and 418 and may allow pods 416 and 418 to access persistent volumes 420 and 422.

Deployment services 412-414 may be objects that are configured to deploy pods 428 and 430, respectively, on their respective nodes of the computing cluster. Deployment services 412-414 may modify or create pods 428 and 430, respectively.

Furthermore, pods 428 and 430 may be part of one or more micro-services of application 400. Pods 428 and 430 may correspond with persistent volumes 432 and 434, respectively. Pods 428 and 430 may access persistent volumes 432, and 434 using persistent volume claims 436 and 438, respectively.

A user may interface with data engine 102 using client device 130 to change the makeup of application 400. The user may add, remove or modify application 400's micro-services, workloads, persistent volumes, persistent volume calls, or the like.

Figure 5:
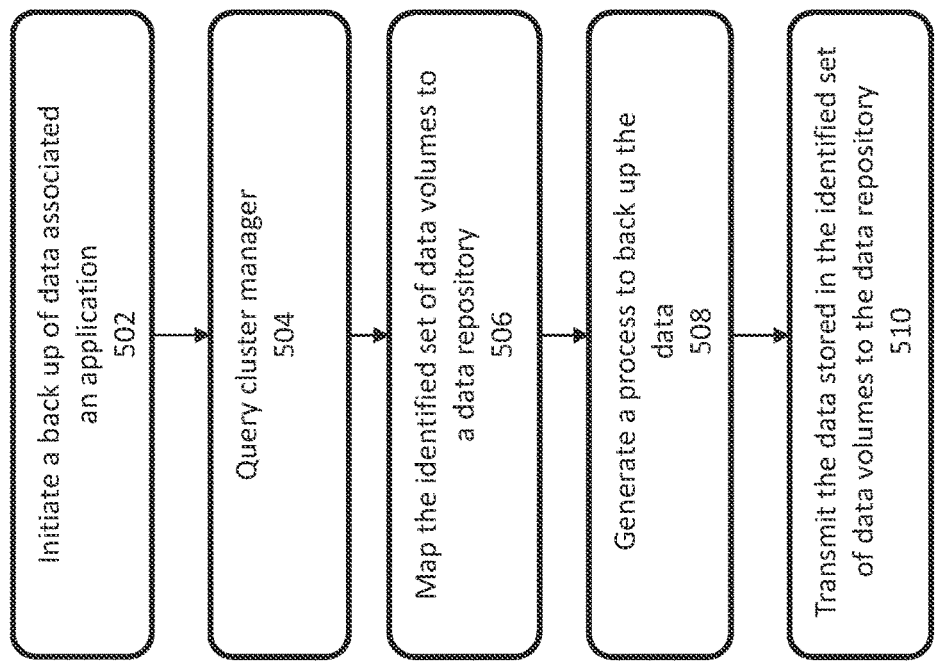
FIG. 5 is a flowchart illustrating a process for backing up data of a cloud-native application, according to some embodiments.

FIG. 5 is a flowchart illustrating a process for backing up data of a cloud-native application, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, data engine 102 initiates a backup of data associated with an application 115. Application 115 comprises a set of micro-services 116 executing across one or more nodes 114 of computing cluster 100. The one or more nodes 114 may be virtual machines, and application 115 may be a cloud-native application. Data engine 102 may initiate the backup of the data associated with application 115 based on a scheduled backup or a circumstance that triggered a backup. Data engine 102 may retrieve the schedule of backups for application 115 or circumstances which trigger a backup from policies 104.

In 504, data engine 102 queries cluster manager 110 to identify a set of data volumes 118 corresponding to the set of micro-services 116. The set of data volumes 118 may be store the data associated with the application 115. The query may include an identifier of application 115. Cluster manager 110 may identify the set of micro-services 116 and the set of data volumes 118 executing under application 115's namespace across the one or more nodes 114 using the identifier of application 115.

In 506, data engine 102 maps the identified set of data volumes 118 to a data repository 120 dedicated to store a backup of the data associated with application 115. Data engine 102 may determine that data repository 120 is dedicated to storing a backup of the data associated with application 115 using policies 104.

In 508, job manager 108 generates one or more processes 112 to back up the data stored in the identified one or more data volumes 118 based on the mapping. Job manager 108 may generate at least one process of the one or more processes 112 for each data volume of the set of data volumes 118 corresponding to the set of micro-services 116. The at least one process of the one or more processes 112 for each data volume 118 are to be executed in the application namespace of application 115 in the respective node 114. The one or more processes 112 may include instructions to copy the data stored in the respective data volume 118 and store the copy of the data in data repository 120. The instructions may include an identifier of each of the set of data volumes 118, the set of micro-services 116, the one or more nodes 114, and data repository 120.

In 510, the one or more processes 112 transmits the data stored in the identified set of data volumes 118 to data repository 120 for backup. Each element of the copy of the backup of the data may be correlated to the corresponding data volume 118, micro-service 116, and node 114 in data repository 120. Furthermore, the backup of the data may be correlated with a particular date and time of the backup in data repository 120.

Figure 6:
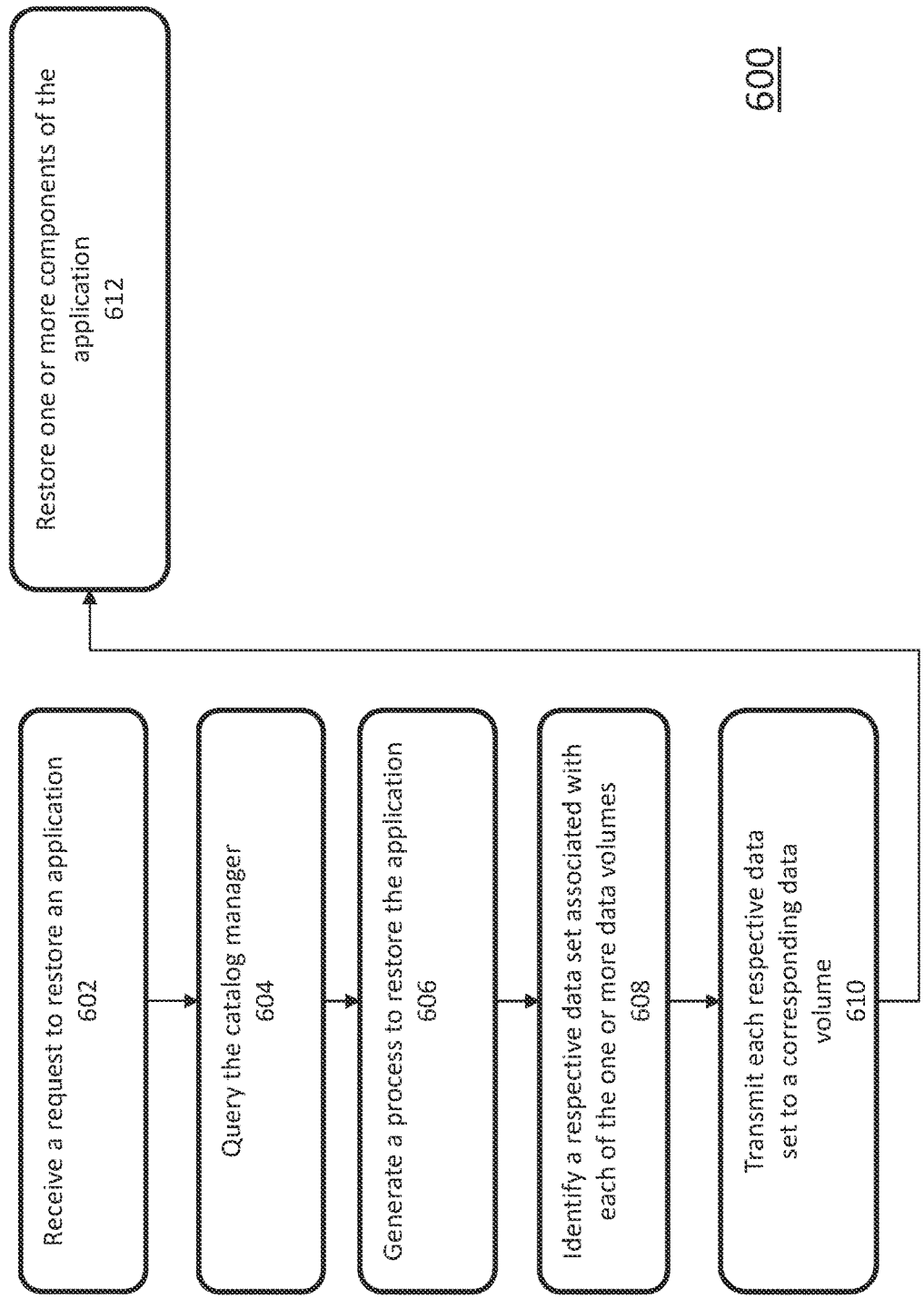
FIG. 6 is a flowchart illustrating a process for recovering a cloud-native application, according to some embodiments.

FIG. 6 is a flowchart illustrating a process for recovering a cloud-native application, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art.

Method 600 shall be described with reference to FIG. 1. However, method 600 is not limited to that example embodiment.

In 602, data engine 102 receives a request to restore an application 115. The request to restore application 115 may be in response to an operational error in application 115. The operational error may occur based on a disaster, system failure, or outage. The request may be received from client device 130 or may be automatically generated in response to detecting the operational error in the one or more micro-services 116.

In 604, data engine 102 queries a catalog manager 111 to identify a set of micro-services 116 and corresponding set of data volumes 118 of application 115. The catalog manager 111 may be a service in computing cluster 100 that stores the composition of each application. In some embodiments, the composition of each application may be stored in data repository 120. The set of micro-services 116 and set of data volumes 118 may be different from the set of micro-services 116 and data volumes 118 that were identified when backing up application 115's data. For example, a user may have added, removed, or modified micro-services 116 or data volumes 118 in application 115 since the backup of application 115.

In 606, job manager 108 of data engine 102 generates one or more processes 112 to restore application 115. Job manager 108 may generate at least one process of the one or more processes 112 for each data volume of the set of data volumes 118. The at least one process of the one or more processes 112 for each data volume of the set of data volumes 118 are to be executed in the application namespace of application 115 on the respective nodes 114. The one or more processes 112 may include instructions to copy the data stored in data repository 120 and transmit the copied data to the set of data volumes 118 for storage. Data repository 120 may be dedicated to store backup data associated with application 115. The instructions may specify that the data is associated with the set of data volumes 118 corresponding to the set of micro-services 116. Furthermore, the instructions may specify the one or more nodes 114 configured to execute the set of micro-services 116.

In 608, the at least one process of the one or more processes 112 for each data volume of the set of data volumes 118 identifies a data set associated with each respective data volume 118 from the backup of the data stored in data repository 120. The at least one process of the one or more processes 112 for each data volume may correspond to each identified data set with a data volume of the set of data volumes 118 based on the instructions. In some embodiments, data repository 120 stores the composition of each application. As a result, the one or more processes 112 may identify each data volume for each of the data volumes of the set of data volumes 118 based on the composition of application stored in data repository 120.

In 610, the at least one process of the one or more processes 112 for each data volume of the set of data volumes 118 transmits each respective identified data set from data repository 120 to the respective data volume 118 for storage. The data may be stored in the respective data volume 118 in a desired order.

In 612, the at least one process of the one or more processes 112 for each data volume of the set of data volumes 118 restores one or more of components of application 115 using a corresponding identified data set. The components may include workloads, stateful sets, deployment services, micro-services, data volumes, etc. Once application 115's data and components are restored, application 115 may be relaunched, and the one or more processes 112 for each data volume may be terminated.

Figure 7:
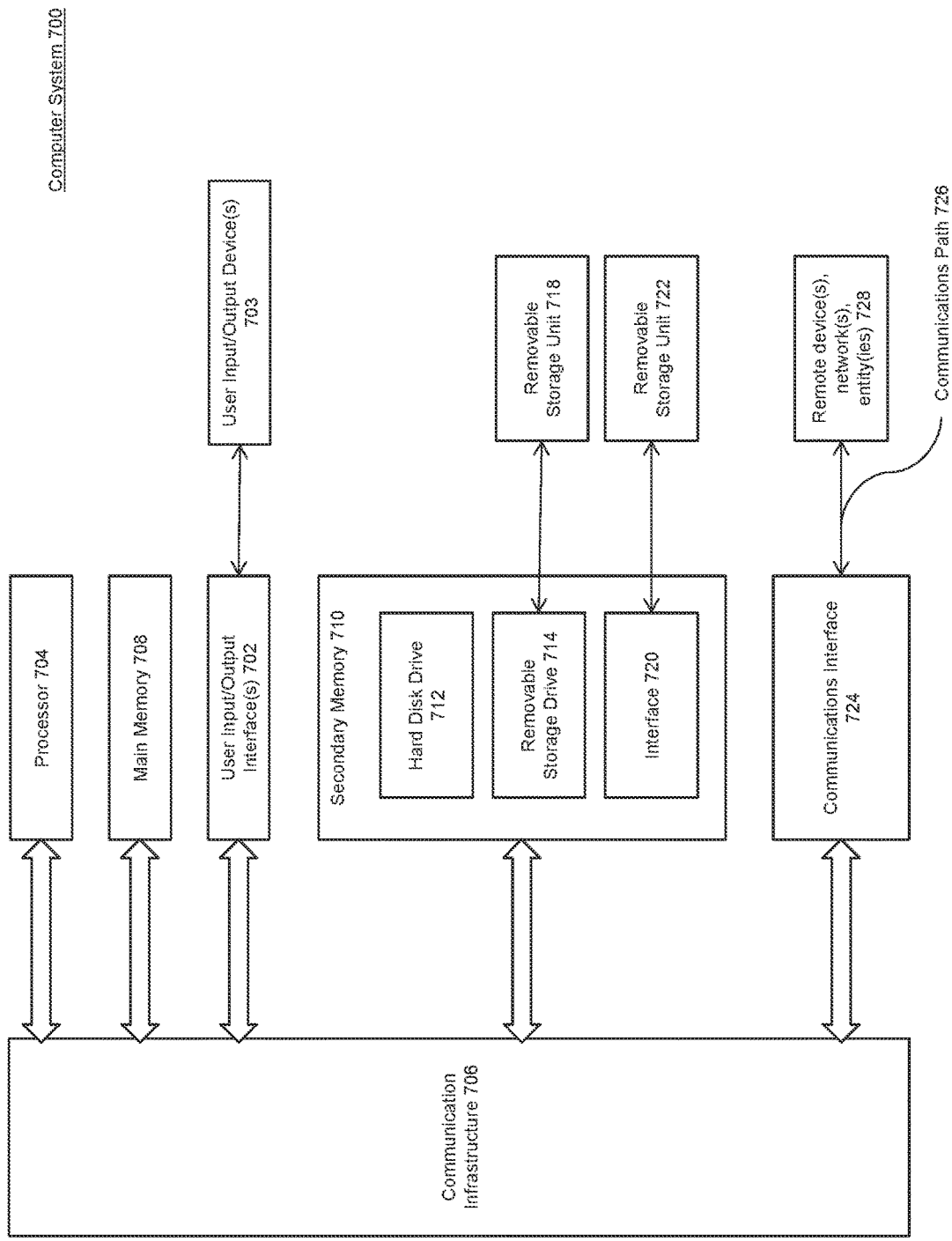
FIG. 7 is an example computer system useful for implementing various embodiments.

Various embodiments can be implemented, for example, using one or more computer systems, such as computer system 700 shown in FIG. 7. Computer system 700 can be used, for example, to implement methods 500 of FIG. 5, and 500 of FIG. 6. Furthermore, computer system 700 can be at least part of computing cluster 100, node(s) 114, data volume(s) 118, data repository(ies) 120, and client device 130, as shown in FIG. 1. For example, computer system 700 route communication to various applications. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for backing up application data, the method comprising:

initiating, by a processor, a backup of updated data associated with an application, wherein the application comprises a first set of micro-services executing across one or more nodes of a computing cluster;

querying, by the processor, a cluster manager of the computing cluster to identify a first set of data volumes corresponding to the first set of micro-services, wherein the identified first set of data volumes store the updated data associated with the application;

sending, by the processor, using a process generated to back up the data stored in the identified first set of data volumes based on a mapping of the identified first set of data volumes to a deduplication domain that includes a data repository dedicated to storing an incremental backup of the updated data associated with the application without storing data from any other application, the updated data stored in the identified first set of data volumes to the data repository for backup;

deduplicating, by the processor, the backup of the updated data in the deduplication domain;

generating, by the processor, based on an operational error with a micro-service of the first set of micro-services, a request to restore the application to a version of the application corresponding to temporal information that indicates a configuration of the application existing before the operational error;

determining, by the processor, based on the request to restore the application and a respective function for each micro-service of the first set of micro-services, an order in which the plurality of components of the application are to be restored; and restoring, by the processor, based on a schedule determined from the temporal information and the order in which the plurality of components of the application are to be restored, the version of the application corresponding to the temporal information.

2. The method of claim 1, further comprising:

correlating, by the processor, each element of the backup of the updated data in the data repository to a corresponding data volume of the first set of data volumes; and correlating, by the processor, each element of the backup of the updated data in the data repository to a corresponding micro-service of the first set of micro-services.

3. The method of claim 1, further comprising:

receiving, by the processor, a request to restore another application;

querying, by the processor, the cluster manager of the computing cluster to identify a second set of data volumes corresponding to a second set micro-services;

generating, by the processor, a process to restore the another application;

restoring, by the processor, using the process to restore the another application, the another application by:
identifying, by the processor, a respective data set associated with each of the identified second set of data volumes from the backup of the updated data stored in the data repository;
sending by the processor, each respective identified data set to a corresponding data volume of the identified second set of data volumes for storage; and
restoring, by the processor, one or more components of the another application using a corresponding identified data set.

4. The method of claim 1, wherein an encryption key is used to encrypt the updated data stored in the data repository, and a decryption key is used to decrypt the backup of the updated data stored in the data repository.

5. The method of claim 1, further comprising:
inserting, by the processor, a new process in an application namespace of the application in a corresponding node.

6. The method of claim 1, wherein the first set of micro-services of the application are executing within an application namespace of the application in the one or more nodes.

7. A system for backing up application data, the system comprising:
a memory; and
a processor coupled to the memory and configured to perform operations comprising:
initiating a backup of updated data associated with an application, wherein the application comprises a first set of micro-services executing across one or more nodes of a computing cluster;
querying a cluster manager of the computing cluster to identify a first set of data volumes corresponding to the first set of micro-services, wherein the identified first set of data volumes store the updated data associated with the application;
sending using a process generated to back up the data stored in the identified first set of data volumes based on a mapping of the identified first set of data volumes to a deduplication domain that includes a data repository dedicated to storing an incremental backup of the updated data associated with the application without storing data from any other application, the updated data stored in the identified first set of data volumes to the data repository for backup;
deduplicating the backup of the updated data in the deduplication domain;
generating, based on an operational error with a micro-service of the first set of micro-services, a request to restore the application to a version of the application corresponding to temporal information that indicates a configuration of the application existing before the operational error;
determining, based on the request to restore the application and a respective function for each micro-service of the first set of micro-services, an order in which the plurality of components of the application are to be restored; and
restoring, based on a schedule determined from the temporal information and the order in which the plurality of components of the application are to be restored, the version of the application corresponding to the temporal information.

8. The system of claim 7, the operations further comprising:
correlating each element of the backup of the updated data in the data repository to a corresponding data volume of the first set of data volumes; and
correlating each element of the backup of the updated data in the data repository to a corresponding micro-service of the first set of micro-services.

9. The system of claim 7, the operations further comprising:
receiving a request to restore another application;
querying the cluster manager of the computing cluster to identify a second set of data volumes corresponding to a second set micro-services;
generating a process to restore the another application;
restoring using the process to restore the another application, the another application by:
identifying a respective data set associated with each of the identified second set of data volumes from the backup of the updated data stored in the data repository;
sending each respective identified data set to a corresponding data volume of the identified second set of data volumes for storage; and
restoring one or more components of the another application using a corresponding identified data set.

10. The system of claim 7, wherein an encryption key is used to encrypt the updated data stored in the data repository, and a decryption key is used to decrypt the backup of the updated data stored in the data repository.

11. The system of claim 7, the operations further comprising:
inserting a new process in an application namespace of the application in a corresponding node.

12. The system of claim 7, wherein the first set of micro-services of the application are executing within an application namespace of the application in the one or more nodes.

13. A non-transitory computer-readable medium having instructions stored thereon that, when executed by at least one computing device, cause the at least one computing device to perform operations comprising, the operations comprising:
initiating a backup of updated data associated with an application, wherein the application comprises a first set of micro-services executing across one or more nodes of a computing cluster;
querying a cluster manager of the computing cluster to identify a first set of data volumes corresponding to the first set of micro-services, wherein the identified first set of data volumes store the updated data associated with the application;
sending using a process generated to back up the data stored in the identified first set of data volumes based on a mapping of the identified first set of data volumes to a deduplication domain that includes a data repository dedicated to storing an incremental backup of the updated data associated with the application without storing data from any other application, the updated data stored in the identified first set of data volumes to the data repository for backup;
deduplicating the backup of the updated data in the deduplication domain;
generating, based on an operational error with a micro-service of the first set of micro-services, a request to restore the application to a version of the application corresponding to temporal information that indicates a configuration of the application existing before the operational error;

determining, based on the request to restore the application and a respective function for each micro-service of the first set of micro-services, an order in which the plurality of components of the application are to be restored; and restoring, based on a schedule determined from the temporal information and the order in which the plurality of components of the application are to be restored, the version of the application corresponding to the temporal information.

14. The non-transitory computer-readable medium of claim 13, wherein the operations further comprise:
deduplicating the backup of the updated data stored in the data repository.

15. The non-transitory computer-readable medium of claim 13, wherein the operations further comprise:
correlating each element of the backup of the updated data in the data repository to a corresponding data volume of the first set of data volumes; and
correlating each element of the backup of the updated data in the data repository to a corresponding micro-service of the first set of micro-services.

16. The non-transitory computer-readable medium of claim 13, wherein the operations further comprise:
receiving a request to restore another application;
querying the cluster manager of the computing cluster to identify a second set of data volumes corresponding to a second set micro-services;
generating a process to restore the another application;
restoring using the process to restore the another application, the another application by:
identifying a respective data set associated with each of the identified second set of data volumes from the backup of the updated data stored in the data repository;
sending each respective identified data set to a corresponding data volume of the identified second set of data volumes for storage; and
restoring one or more components of the another application using a corresponding identified data set.

17. The non-transitory computer-readable medium of claim 13, wherein an encryption key is used to encrypt the updated data stored in the data repository, and a decryption key is used to decrypt the backup of the updated data stored in the data repository.

18. The non-transitory computer-readable medium of claim 13, wherein the operations further comprise including a new process in an application namespace of the application in a corresponding node.

* * * * *

UNITED STATES PATENT AND TRADEMARK OFFICE
CERTIFICATE OF CORRECTION

PATENT NO. : 12,153,497 B2
APPLICATION NO. : 17/200278
DATED : November 26, 2024
INVENTOR(S) : Devaraj et al.

Page 1 of 1

It is certified that error appears in the above-identified patent and that said Letters Patent is hereby corrected as shown below:

In the Claims

In Column 18, Claim 1, Line 25, after "back up" delete "the".

In Column 18, Claim 1, Line 44, delete "the" and insert -- a --.

In Column 18, Claim 3, Line 65, delete "set" and insert -- set of --.

In Column 18, Claim 3, Line 67, delete "application;" and insert -- application; and --.

In Column 19, Claim 7, Line 40, after "back up" delete "the".

In Column 19, Claim 7, Line 61, delete "the" and insert -- a --.

In Column 20, Claim 9, Line 14, delete "set" and insert -- set of --.

In Column 20, Claim 9, Line 15, delete "application;" and insert -- application; and --.

In Column 20, Claim 9, Line 16, delete "restoring" and insert -- restoring, --.

In Column 20, Claim 13, Line 43, delete "comprising, the operations comprising:" and insert -- comprising: --.

In Column 20, Claim 7, Line 54, after "back up" delete "the".

In Column 21, Claim 13, Line 6, delete "the" and insert -- a --.

In Column 22, Claim 16, Line 4, delete "set" and insert -- set of --.

In Column 22, Claim 16, Line 6, delete "restoring" and insert -- restoring, --.

Signed and Sealed this
Fourteenth Day of January, 2025

Derrick Brent
*Acting Director of the United States Patent and Trademark Office*